(12) United States Patent
Anderfaas et al.

(10) Patent No.: US 11,318,782 B2
(45) Date of Patent: May 3, 2022

(54) VARIABLE COMPLIANCE WHEEL

(71) Applicant: MillenWorks, Tustin, CA (US)

(72) Inventors: Eric Anderfaas, Westminster, CA (US);
Brian Miller, Laguna Niguel, CA (US);
Dean Banks, Costa Mesa, CA (US);
Jon Charland, Long Beach, CA (US);
David Clemens, Tustin, CA (US);
Chris Culbertson, Irvine, CA (US);
Peter LeNoach, Irvine, CA (US); Jared Trauernicht, Huntington Beach, CA (US)

(73) Assignee: MillenWorks, Charlotte, NC (US)

( * ) Notice: Subject to any disclaimer, the term of this patent is extended or adjusted under 35 U.S.C. 154(b) by 0 days.

(21) Appl. No.: 16/503,361

(22) Filed: Jul. 3, 2019

(65) Prior Publication Data
US 2019/0344613 A1     Nov. 14, 2019

Related U.S. Application Data

(60) Continuation of application No. 15/817,033, filed on Nov. 17, 2017, now abandoned, which is a continuation of application No. 14/135,410, filed on Dec. 19, 2013, now abandoned, which is a division of application No. 11/574,810, filed on Mar. 6, 2007, now Pat. No. 8,631,844, and a continuation-in-part of application No. PCT/US2005/015478, filed on Jun. 13, 2005.

(60) Provisional application No. 60/869,714, filed on Dec. 12, 2006.

(51) Int. Cl.
*B60B 9/26*     (2006.01)
*B60C 7/14*     (2006.01)
*B60C 7/10*     (2006.01)
*B60B 9/04*     (2006.01)
*B60C 7/18*     (2006.01)
*B60C 19/00*    (2006.01)

(52) U.S. Cl.
CPC ............... *B60B 9/26* (2013.01); *B60B 9/04* (2013.01); *B60C 7/10* (2013.01); *B60C 7/14* (2013.01); *B60C 7/18* (2013.01); *B60C 19/00* (2013.01)

(58) Field of Classification Search
CPC .... B60B 9/10; B60B 9/00; B60B 9/02; B60B 9/14; B60B 9/26; B60C 7/14; B60C 7/00; B60C 7/10; B60C 2007/146
See application file for complete search history.

(56) References Cited

U.S. PATENT DOCUMENTS

| | | |
|---|---|---|
| 384,650 A | 6/1888 | Stribling |
| 393,218 A | 11/1888 | Cummins |
| 413,760 A | 10/1889 | Marsh |
| 434,041 A | 8/1890 | Carpentier |
| 1,289,780 A | 12/1918 | Hoyt |
| 1,949,695 A | 3/1934 | Shoemaker |
| 2,246,492 A | 6/1941 | Aldridge |
| 6,431,235 B1 | 8/2002 | Steinke |
| 6,615,888 B2 | 9/2003 | Elkow |
| 8,631,844 B2 | 1/2014 | Anderfaas |

(Continued)

*Primary Examiner* — Jason R Bellinger
(74) *Attorney, Agent, or Firm* — Inskeep IP Group, Inc.

(57) ABSTRACT

A system for adjusting the compliance of a wheel is provided. In one embodiment, wheel segments are adjusted, causing the stiffness of the wheel to change. Such adjustments can be made while the wheel is rotating, allowing the wheel compliance to be changed while a vehicle is in motion.

15 Claims, 19 Drawing Sheets

(56) References Cited

U.S. PATENT DOCUMENTS

2014/0110024 A1    4/2014   Anderfaas
2018/0072095 A1*  3/2018   Anderfaas ............... B60C 19/00

* cited by examiner

VARIABLE COMPLIANCE WHEEL

RELATED APPLICATIONS

This application is a continuation of and claims priority to U.S. patent application Ser. No. 15/817,033 filed Nov. 17, 2017 entitled Variable Compliance Wheel (now abandoned), which is a continuation of and claims priority to U.S. patent application Ser. No. 14/135,410 filed Dec. 19, 2013 entitled Variable Compliance Wheel (now abandoned), which is a divisional of and claims priority to U.S. patent application Ser. No. 11/574,810 filed Mar. 6, 2007 entitled Variable Compliance Wheel (now U.S. Pat. No. 8,631,844), which is a continuation-in-part of and claims priority to International Patent Application No. PCT/US05/15478, International Filing Date 13 Jun. 2005, entitled Variable Radial And/Or Lateral Compliance Wheel and which claims priority to U.S. Provisional Application Ser. No. 60/869,714 filed Dec. 12, 2006 entitled Variable Compliance Wheel, all of which are hereby incorporated by reference in their entireties.

BACKGROUND OF THE INVENTION

The present invention generally relates to a wheel with variable compliance having many applications, including ground vehicle wheels, printing press rollers, material processing and handling equipment. More particularly, the present invention relates to a wheel that includes a rim having a center axis of rotation and a plurality of wheel segments engaged with the rim and connecting to a radial band appropriate for the intended usage of the wheel, where the rim and plurality of wheel segments are adapted to rotate about the center axis, and where the attachment points to the rim of the plurality of wheel segments can be moved in the direction of the axis of rotation. In the example of a ground vehicle application, the radial band includes tread elements to improve vehicle traction in wet or rough road surfaces or in complex terrain. For material handling applications, the radial band may have a smooth surface to apply even pressure to a printing medium, for example, or may contain striations or tread elements as required.

Various mechanisms currently exist for varying the ground contact pressure of a tire while a vehicle is being driven. This capability allows a vehicle to traverse soft soils by lowering the pressure within the tire, without compromising on-road performance. This is commonly achieved by varying the pressure within the carcass of a tire through the control of an air valve mounted on the wheel that can vent the tire's internal air to atmospheric pressure or to the pressure produced by an onboard air compressor plumbed through an airtight rotary seal. The commercial term for such a system is Central Tire Inflation System (CTIS). One such system is U.S. Pat. No. 5,553,647, "Central tire inflation system," (Miroslav), the contents of which are hereby incorporated by reference, that describes a pressure air source, plumbing, valve, pressure sensor, and control system for varying the internal air pressure of a tire while driving. The shortcomings of this design are complexity, sensitivity to the elements, cost, and inability of the system to maintain adequate tire pressure when the tire is badly damaged.

Several patents have addressed this latter concern of pneumatic tire vulnerability with runflat inserts (U.S. Pat. No. 6,263,935, "Radial ply pneumatic runflat tire," (Oare, et. al.)) or tires that do not rely on fluidic pressure for load carrying, a.k.a. non-pneumatic tires, (U.S. Pat. No. 6,431,235, "Non-pneumatic tire and rim combination," (Steinke, et. al.)), the contents of both of these patents hereby incorporated by reference. The shortcomings of this system are weight and fixed tire stiffness.

The present invention describes a novel way of combining the benefits of variable tire stiffness with a damage tolerant tire design.

SUMMARY OF THE INVENTION

The present invention provides a variable stiffness wheel that can be used in a variety of applications, such as for support of ground vehicle traverse over a variety of terrain or for conveying materials (e.g., airport baggage handling). In one preferred embodiment, the variable stiffness wheel includes a plurality of wheel segments whose attachments to the center rotating rim (inner and outer) can be moved in the direction of the axis of rotation, thereby changing the tension of these elements, which is convenient, in one example, for tuning the ground contact pressure of the tire for the terrain being traversed. The inner attachment being accommodated via a sliding flange located towards the vehicle and the outer being accommodated via another sliding flange located away from the vehicle. Additionally, this method can be used to vary other wheel stiffness parameters such as vertical stiffness, lateral stiffness, torsional stiffness (about the axis of rotation or about an axis perpendicular to the axis of rotation) each of which can affect overall behavior of the system the wheel is used in (e.g., vehicle performance).

With the inner and outer wheel segment attachment points close together tensioning the spokes, the vertical stiffness of the wheel is increased. In the example of the vehicle wheel, this increased stiffness generally provides excellent on-road performance (cornering, steering feel, low rolling resistance, etc.) and increased payload carrying capacity and increased durability at high speeds.

With the inner and outer wheel segment attachment points spread apart from one another, the vertical stiffness of the wheel is reduced, enlarging the contact patch of the wheel with, for example, the ground, baggage, or other material. In the example of a printer, the stiffness of the print roller can be modulated to compensate for plate wear, extending the life of the plate and improving the throughput of the press. In the example of the vehicle wheel, the tire/terrain enveloping performance is improved, while the lower ground pressure gives the vehicle better off-road mobility on soft soils like mud, sand, and snow.

Continuing with the example of the vehicle, the inner and outer wheel segment attachment points spread far apart from one another which allows the vehicle to be lowered, thereby facilitating transportation in low clearance vehicles like aircraft. The lower ground pressure of this configuration is also beneficial to ramps and cargo floors that have strict limits on floor loading pressure due to floor structure limitations imposed by weight constraints, as is the case with many aircraft.

The inner and outer wheel segment attachment points can be varied from the maximum and minimum spacing while driving to suit the immediate needs of the vehicle.

Multiple inner and outer wheel segments can be stacked to produce a wheel with varying radial stiffness across the width of the wheel. This is beneficial for improving the lateral performance of the wheel by controlling the wheel's dynamic camber. In the example of wheels supporting a conveyer belt, this varying stiffness across the wheel width may help direct or steer baggage in a desired direction. In the example of a printer, the varying radial stiffness of a printer roller may direct paper in a desired direction or area, such as continuously adjusting the registration of multicolor press runs. This reduces the waste and rework associated with misregistered press output.

In the example of the vehicle, the dynamic camber can adjusted during cornering to improve maneuvering performance. This can also be beneficial for changing the heading of the vehicle while driving with little or no steering of the tire. By making the stiffness of the innermost pair of inner and outer wheel segments stiffer than the outermost pair, resulting forces at the wheel/road contact patch will serve to pull the vehicle in the direction of the outermost pair of wheel segments. Further, by reversing the relative stiffness between the two sections, the wheel can force the vehicle in the opposite direction. This has the potential of simplifying the steering system, reducing cost and weight, improving the durability of the suspension/steering system by eliminating vulnerable steering links, and reclaiming the swept volume lost to the tire as it steers for other vehicle components or cargo. Additionally, the radial wheel stiffness, when modulated at a high rate, can be used to counteract vehicle pitch and heave vibrations, augmenting or even replacing the vibration isolation functions of the vehicle's suspension system.

DETAILED DESCRIPTION OF THE INVENTION

Figure 1A:
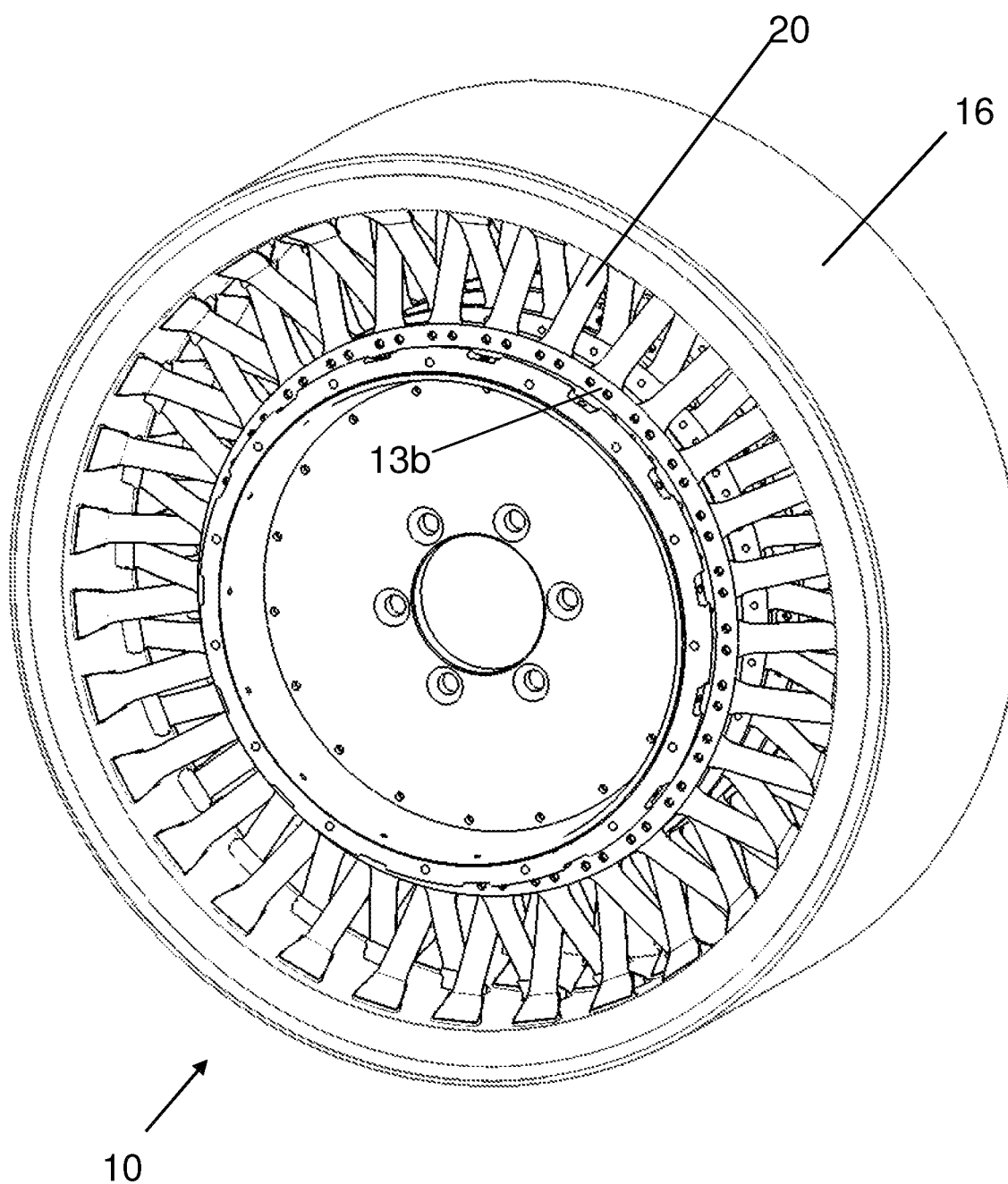
FIG. 1A is an isometric view of a preferred embodiment of a wheel of variable stiffness of the present invention.
Figure 1B:
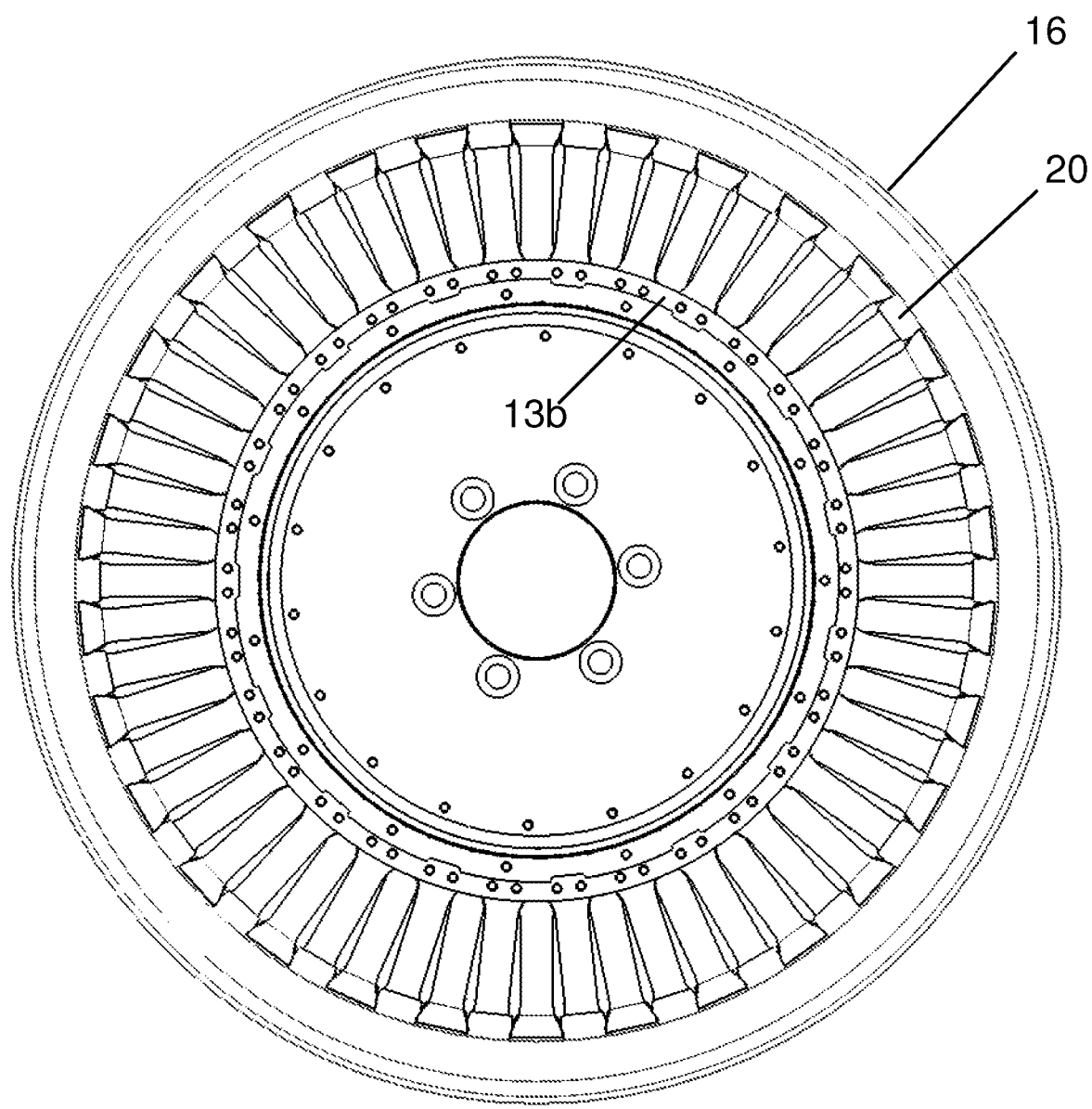
FIG. 1B is a side view of the variable stiffness wheel of FIG. 1.

FIGS. 1A, 1B, 2, and 3 illustrate a first preferred embodiment of a variable stiffness wheel 10. The variable stiffness wheel 10 includes a rim 11, fixed flanges 12b and 13b and movable flanges 12a and 13a (also referred to as rings, plates and collars in this specification), and a plurality of wheel segments 17, 18 (e.g., two oppositely angled spokes 20) engaged with the flanges 12a, 12b, 13a, 13b and an outer traction element 16.

The rim 11 includes an inner flange (not shown) which locates an adaptor plate and thereby allows the wheel 10 to be mounted on a spindle (not shown) which allows the variable stiffness wheel to rotate about the center axis. Preferably the spindle and mounting mechanism is similar to wheel mounting mechanism of present vehicles (e.g., secured by lug nuts). While the variable stiffness wheel 10, as well as other embodiments of the present invention, are described as being used on a vehicle, it should be understood that these embodiments can be used on almost any device that may utilize a wheel, such as to support a conveyer belt or as a roller for a printer.

Figure 2:
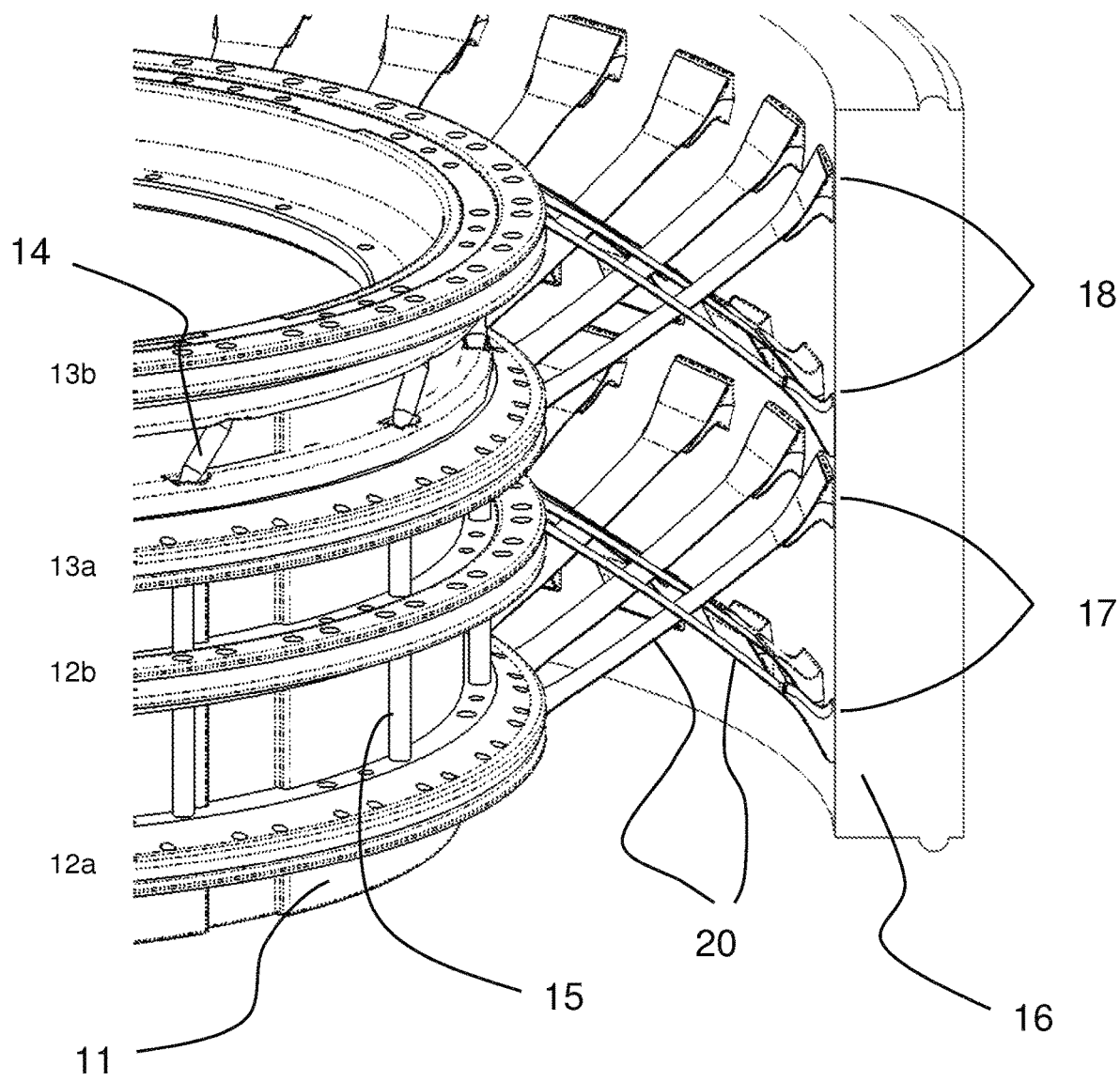
FIG. 2 is a detail isometric view of a cutaway of the variable stiffness wheel of FIG. 1, showing the movable elements of the wheel with a portion of the wheel removed.
Figure 3:
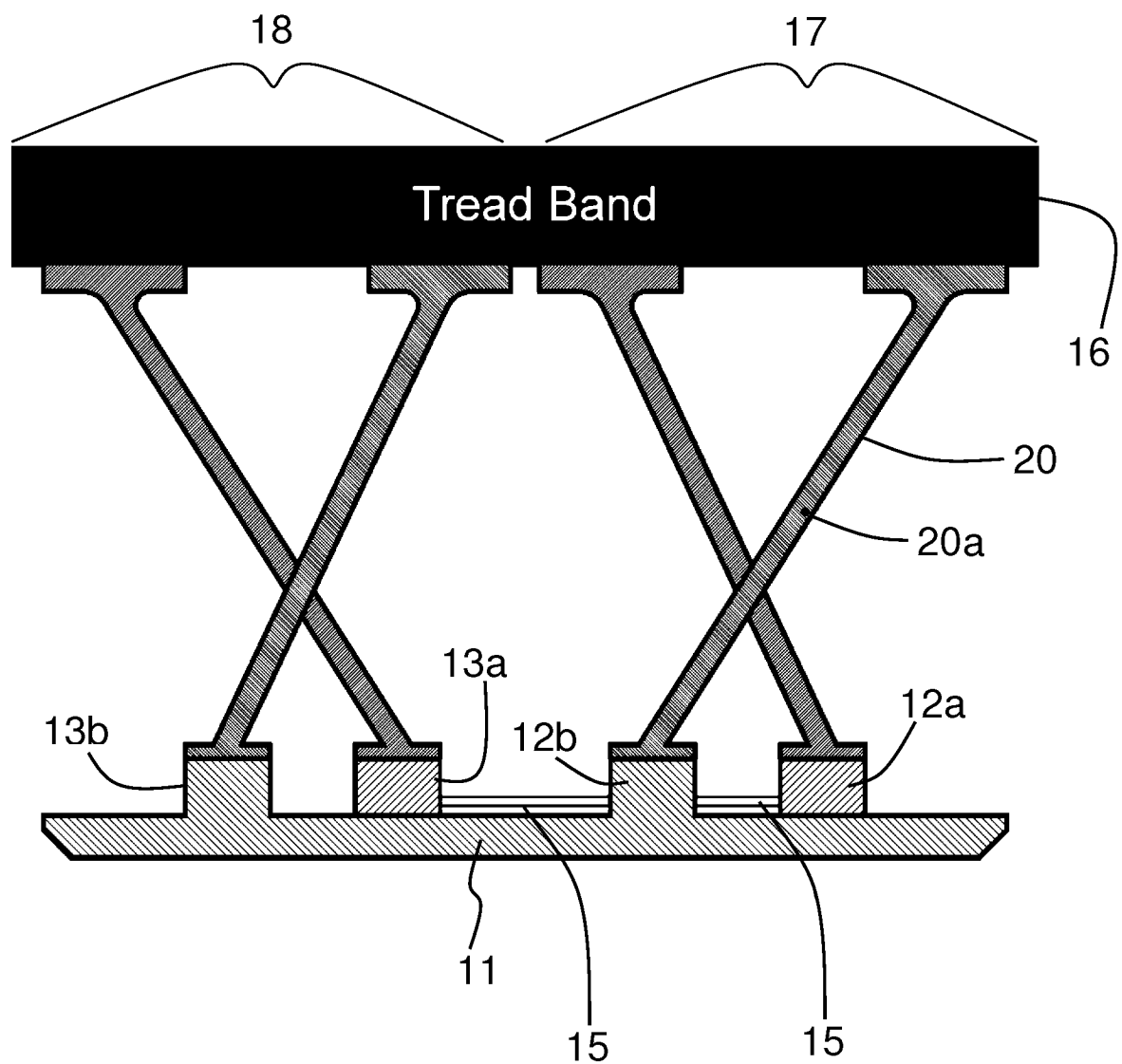
FIG. 3 is a cross sectional view of the variable stiffness wheel of FIG. 1.
Figure 4:
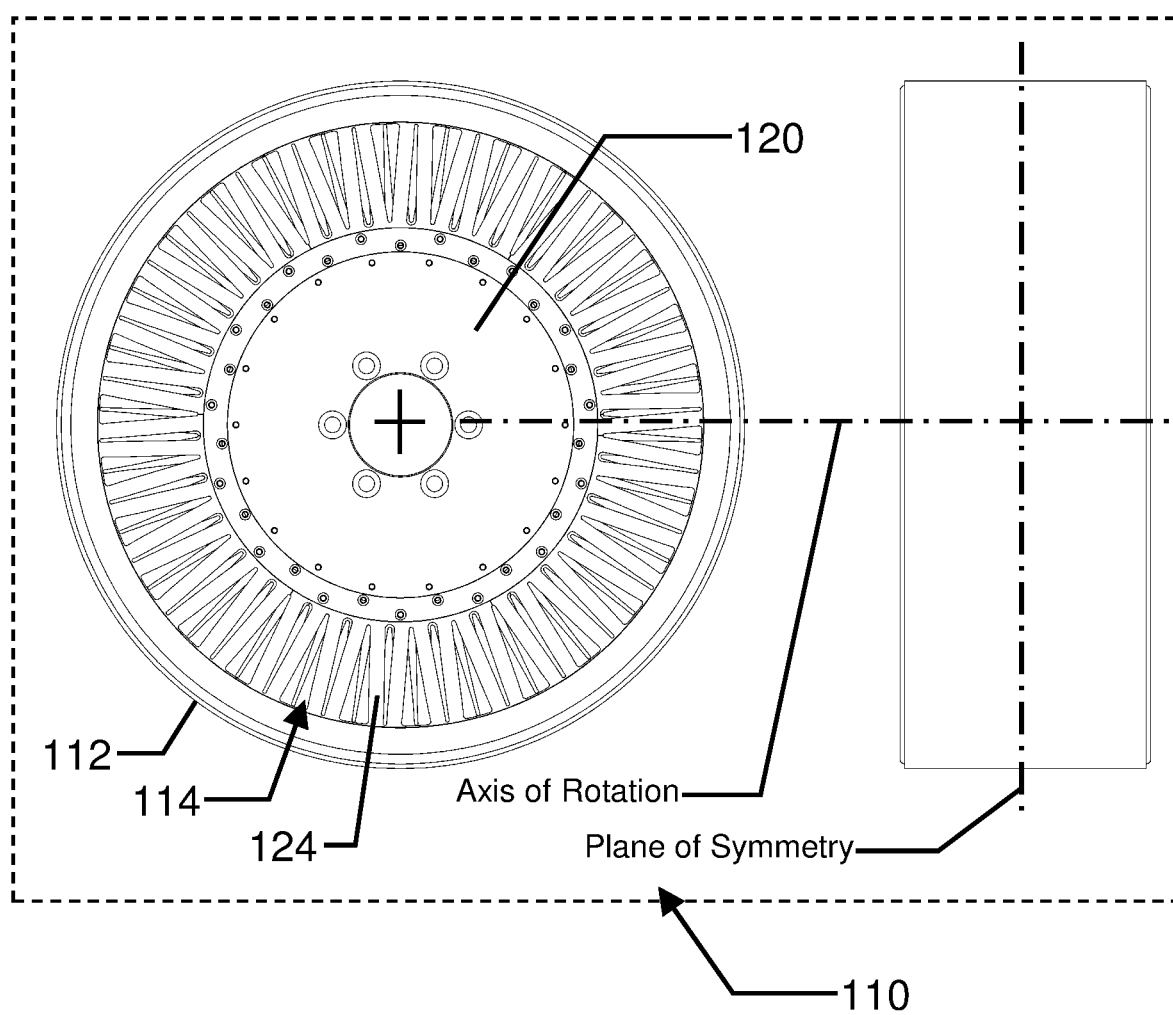
FIG. 4 is a side view of a second preferred embodiment of a wheel of variable stiffness of the present invention.

As best seen in FIGS. 2 and 3, the wheel segments 17, 18 are distributed evenly around the rim 11. In the illustrated preferred embodiment, the wheel 10 includes about one hundred and twenty wheel segments 17 and 18 containing four different wheel segment planes (i.e., the planes formed by each spoke 20 of the segment 17 and 18). It should be obvious to anyone skilled in the art that the variable stiffness wheel 10 may include fewer or more wheel segments 17, 18 and fewer or more wheel segment planes.

The variable stiffness wheel 10 also includes sliding guides 15 engaged with the rim 11 and flanges 12a, 12b, 13a, 13b (the flanges 12a and 13a defining the movable wheel segments and the flanges 12b and 13b defining the nonmoving wheel segments) which affix the base of the plurality of wheel segments 17, 18 (i.e., the base of the spokes 20) to the rim 11. Flanges 13b and 12b are positively affixed to the wheel to restrict linear movement along the axis of rotation. Flanges 12a, 13a slide along the guides 15 and are loaded (i.e., their position is changed) with preload adjusters 14 that are in contact with the flanges 12a, 13a and the rim 11. In this respect, as the preload adjusters 14 (which move via actuators, not shown in these Figures) pull on the flange 13a, force is transferred through guides 15 to flange 12a, causing both flanges 12a and 13a to move towards the preload adjuster 14. Similarly, the preload adjusters 14 release their load, causing the flanges 12a and 13a to move away from the preload adjusters 14.

In an alternate preferred embodiment, all rings may be fixed in place, may slide relative to each other or may include some combination thereof. For example, the inner flanges 13a and 12b may be fixed in place while the outer flanges 12a and 13b may slide relative to the rim 11. Further, each of the wheel segments 17, 18 can be configured to nest between adjacent wheel segments 17, 18 or be stacked in line with each other.

FIG. 2 illustrates a detail isometric view of the variable stiffness wheel 10 with the traction element 16 sectioned away to illustrate the rim 11, sliding rings 12a, 12b, 13a, 13b, and the plurality of wheel segments 17, 18. FIGS. 2 and 3 illustrate the variable stiffness wheel 10 in one particular preload position, where the spacing between the rings 12a, 12b, 13a, 13b is at a nominal position. Where the ring pairs (12a, 12b and 13a, 13b) are closest together, the radial preload on the wheel segments 17, 18 will be at its greatest. This results in the highest radial stiffness of the wheel. Where the ring pairs (12a, 12b and 13a, 13b) are furthest apart, the radial preload on the wheel segments 17, 18 will be at its lowest and the angle of the wheel segments 17, 18 is at their greatest angle with respect to the vertical applied load. Conversely, the lowest preload and weakest wheel segment angle provides the lowest radial stiffness of the wheel.

In the present preferred embodiment, each wheel segment 17, 18 includes two oppositely angled spokes 20 which connect to one of the flanges 12a, 12b, 13a, 13b and to the traction element 16. Preferably the spokes 20 are coupled to the flanges 12a, 12b, 13a, 13b and to the traction element 16 with either adhesive or mechanical fasteners, or by overmolding traction element 16 onto spokes 20. The spokes 20 can comprise a variety of rigid or semi rigid materials such as polymer or composite material.

The preload adjusters 14 preferably include an actuator (not shown in these Figures) which may be controlled by the vehicle or manually adjusted by a user at the wheel itself. In one example, the linear actuator may be a pneumatic actuator driven by a CTIS. In another example, the linear actuator may be an electrical actuator that receives power through a slip ring connection (e.g., similar to the slip ring connections used for communication and power in the turret of a tank) to a chassis electrical system. In yet another example, a linear actuator may be a screw positioned through the rim 11 and connected to the flanges 12a, 12b, 13a, 13b, thereby causing the flanges to move axially.

Preferably, the vehicle includes a control system (e.g., a microprocessor and control software) for monitoring vehicle characteristics such as speed, wheel slippage (e.g., loss of traction on an icy terrain), roughness of terrain, etc., and adjusts the wheel firmness according to preset firmness profiles during vehicle operation. Preferably, a slip ring connection, as known in the art, can be used for communicating or controlling the mechanisms of the wheel 10. In a more specific example, as the vehicle monitors the increasing speed, the microprocessor executing the control software of the vehicle then increases the firmness of the wheel to provide more desired vehicle handling at the higher speed. In an even more specific example, the control software of the control system may include multiple speed ranges so that when the vehicle is traveling at a speed within a predetermined speed range (e.g., between 1 and 20 MPH) the control system sets a predetermined tire firmness.

The control system may also be used for steering the vehicle by only modifying the firmness of a portion of the wheel (e.g., changing the firmness of half of the wheel). Similarly, the control system can adjust a portion of each wheel's firmness to improve handling characteristics of the vehicle, such as handling when cornering.

In other alternate preferred embodiments, the preload adjusters 14 may be actuated through other linear or rotary electromechanical, fluidic, magnetic, or other mechanisms of exerting a force at the base of the movable rings 13a, 12a. In another alternate preferred embodiment, the wheel segments 17, 18 may be directly actuated radially or semi-radially, similar to a camera shutter.

In another alternate preferred embodiment, each spoke 20 includes an inner lumen filled with pressurized media 20a. The pressure of the media within the lumen is increased or decreased to respectively increase or decrease the stiffness of the spoke 20, and therefore adjust the softness of the wheel 10.

In another alternate preferred embodiment, each spoke may be composed of shape memory alloys to increase or decrease the firmness of the spoke 20. For example, the shape memory alloy may include two predetermined shapes such as a straight and curved shape or two different radii of curve shapes. Applying power to the shape memory alloy distorts the spokes 20 between the two predetermined shapes or alternately to curves in between the two predetermined shapes. In this respect, the firmness of the wheel can be adjusted.

In another alternate preferred embodiment, artificial muscles or similar contracting materials (e.g., biomaterials) may be used as a linear actuator as part of the preload adjuster to move the flanges 12a, 12b, 13a, 13b between different positions.

Figure 7A:
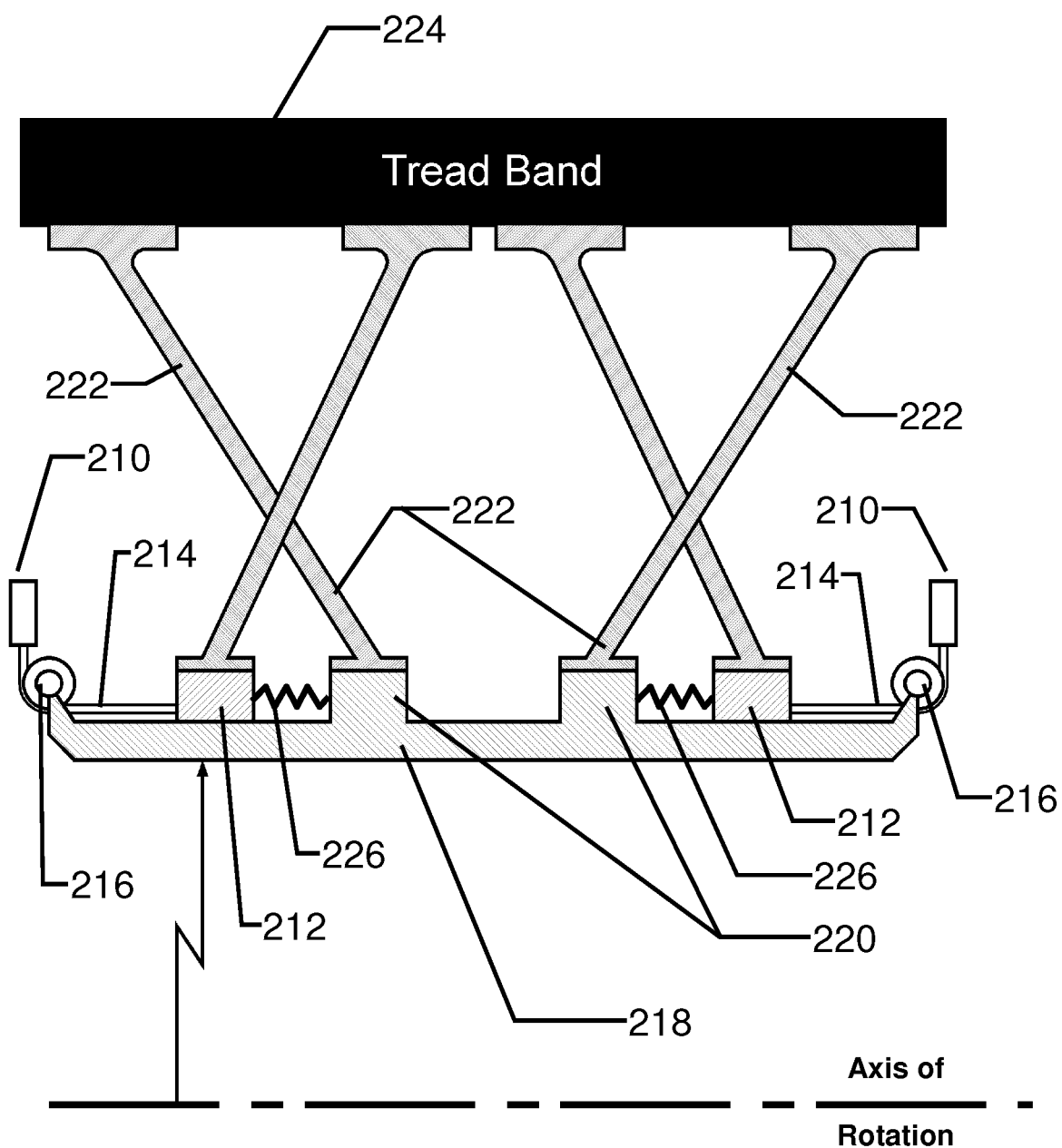
FIG. 7A illustrates a speed-sensitive automatic stiffness adjustment mechanism according to a preferred embodiment of the present invention.
Figure 7B:
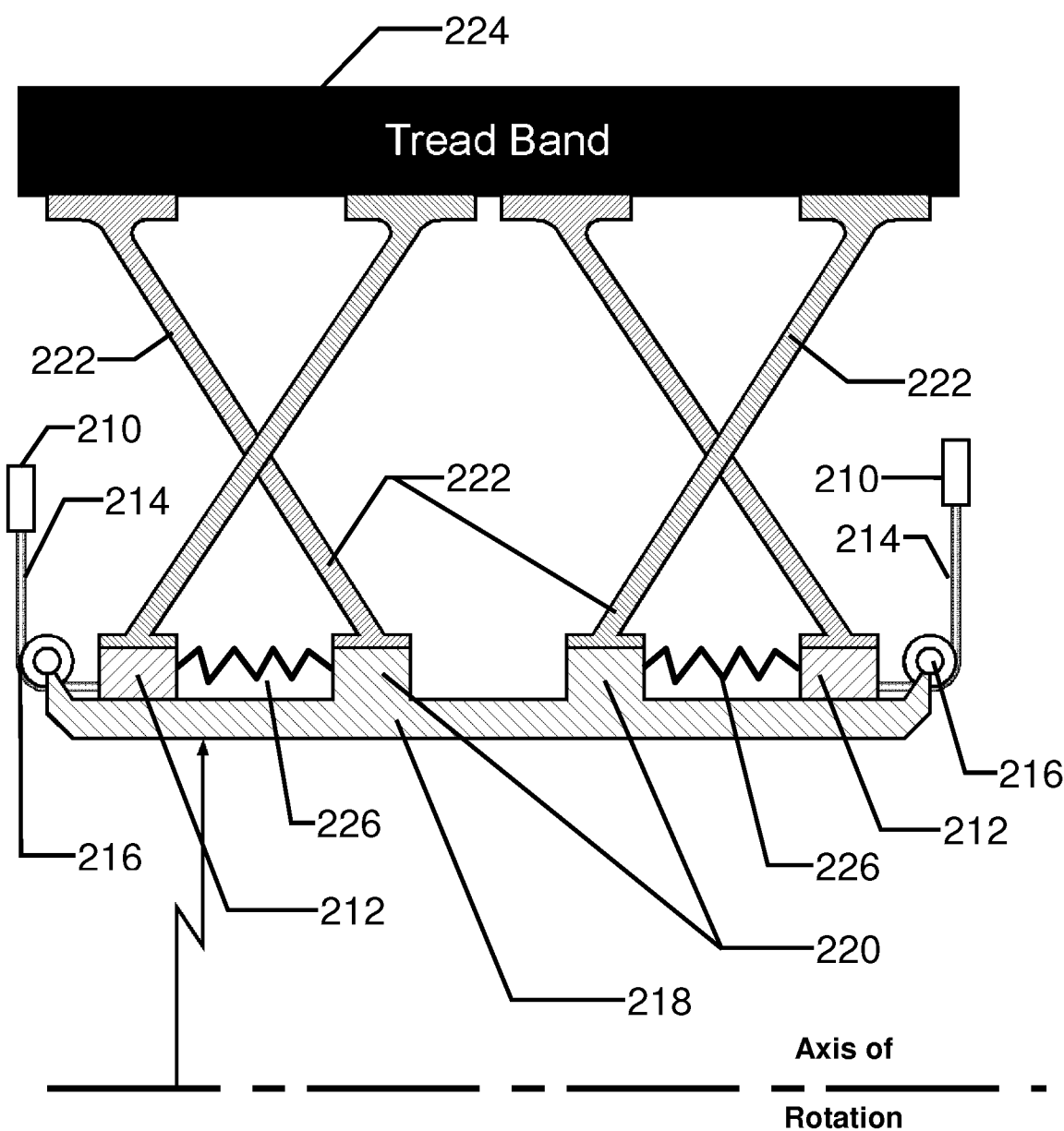
FIG. 7B illustrates a speed-sensitive automatic stiffness adjustment mechanism according to a preferred embodiment of the present invention.

Other mechanisms of adjusting preload tension/compression on the plurality of wheel segments may also include utilization of smart materials like artificial muscles biomaterials, or the replacement of wheel segments with linear or rotary actuators (e.g., as discussed in the preferred embodiment of FIGS. 7A and 7B).

FIGS. 4, 5A, 5B, and 6 illustrate another preferred embodiment of the variable stiffness wheel 110, comprising one or more toroid-shaped spoke rings 114 composed of a plurality of curved spokes 124. One end of each spoke 124 of the spoke ring 114 is connected to a spoke collar 116 which slidably engages the wheel rim 118. The other end of each spoke 124 is connected to the traction element 112, preferably by adhesive, mechanical fasteners, or by overmolding (e.g., overmolding traction element 112 onto the spokes 124).

Figure 5A:
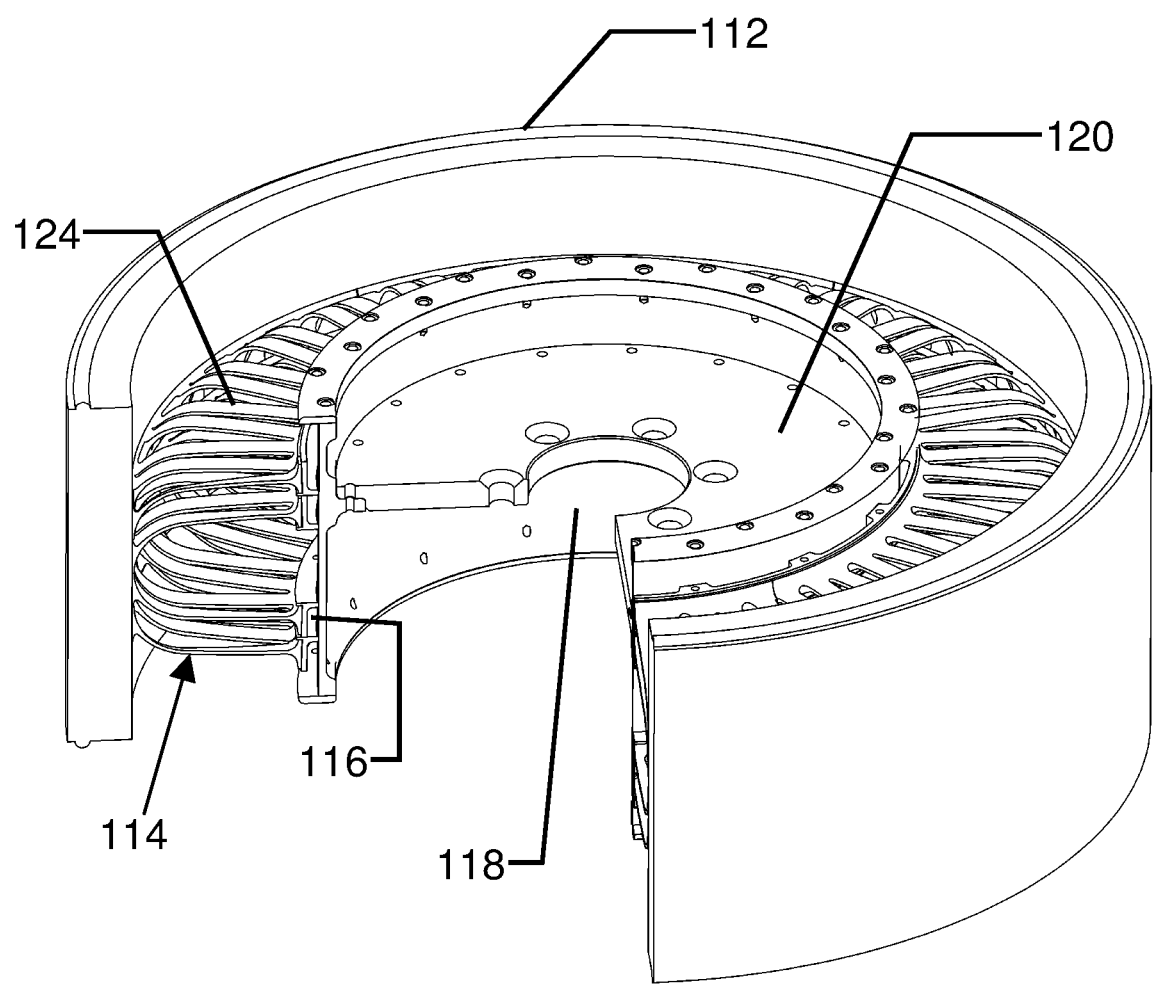
FIG. 5A is an isometric cutaway view of the variable stiffness wheel shown in FIG. 4.
Figure 5B:
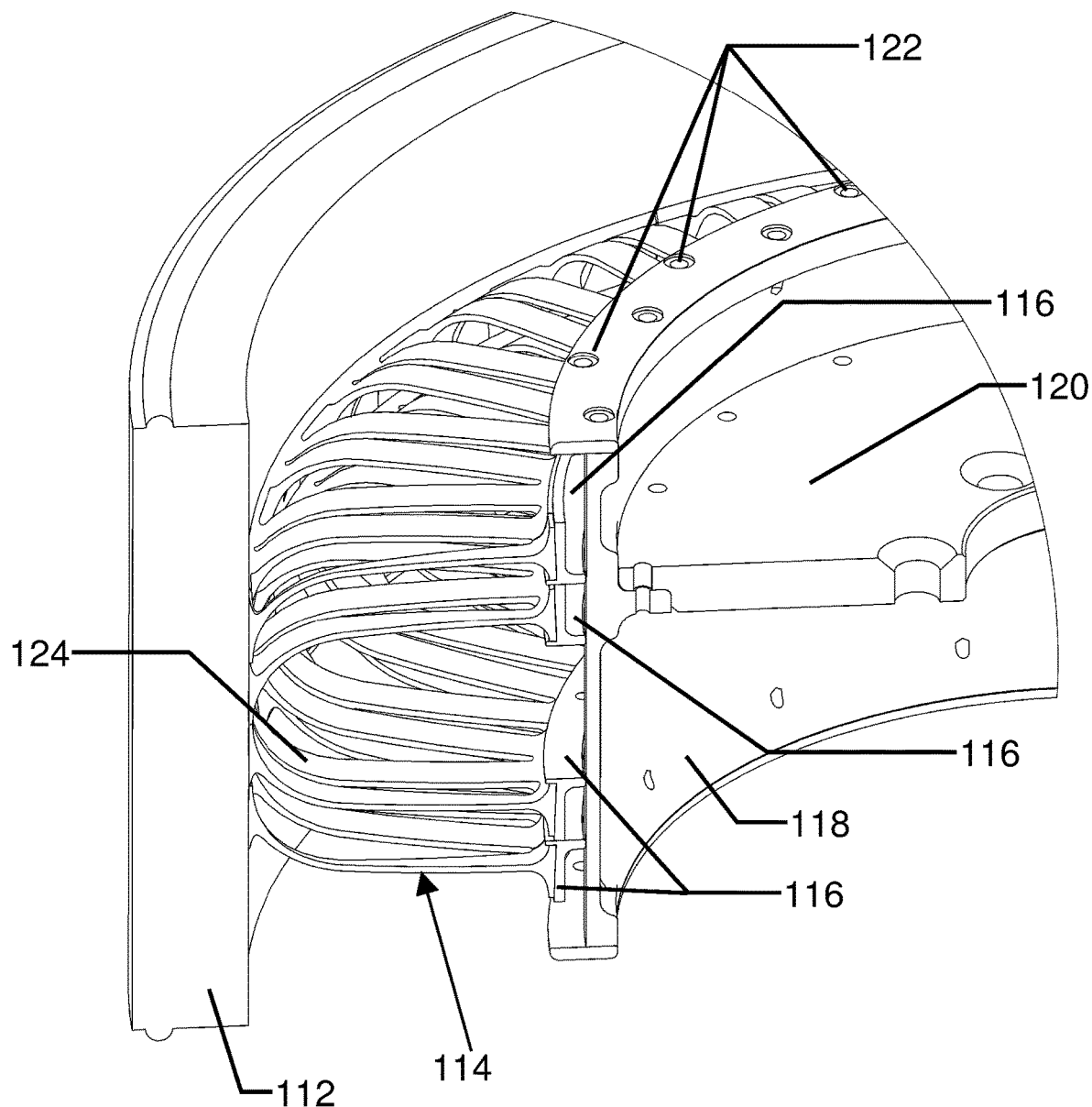
FIG. 5B is an enlarged detail view of FIG. 5A.
Figure 6:
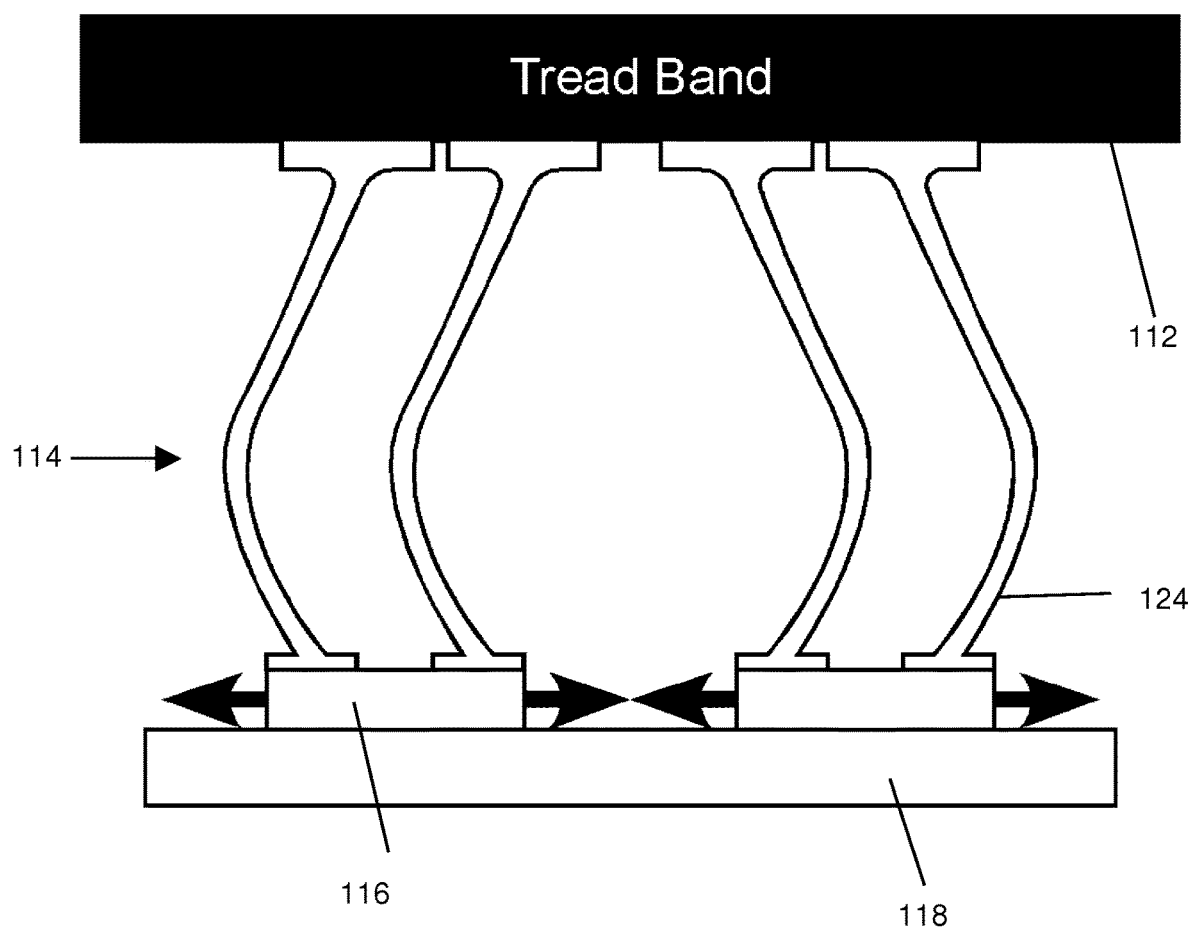
FIG. 6 is a cross sectional view of the preferred embodiment of FIGS. 5A and B.

As seen best in FIGS. 5A, 5B and 6, the wheel 110 includes spoke collars (similar to the flanges or rings described in previous embodiment of this specification) which slide in the direction of the axis of rotation of the rim 118. As the spoke collars 116 slide, the end of the spokes 124 connected to the collar 116 also slides, thereby changing the curve of the spokes and modifying the firmness of the wheel 110.

The wheel 110 is preferably mounted to a vehicle by a mechanism presently known in the art. For example, a wheel center 120 is affixed to a vehicle's wheel spindle (not shown), transmitting torque from the wheel spindle through wheel center 120 to the spoke collar 116 through the sliding guides 122. Torque then is transmitted through the spoke ring 114 to traction element 112 which is in contact with the road surface, imparting braking and tractive forces to the vehicle. Wheel stiffness is increased by exerting a lateral force to the toroid-shaped spoke rings 114 in the direction of the axis of rotation of the wheel 110, away from the plane of symmetry (shown in FIG. 4). Wheel stiffness is reduced by exerting a lateral force to spoke rings 114 towards the plane of symmetry.

FIG. 7A and FIG. 7B illustrate another preferred embodiment according to the present invention of a wheel for automatically increasing radial spoke stiffness according to increasing vehicle speed. Generally, this stiffness adjustment is achieved by harnessing the force of a mass 210 (or optionally a plurality of masses) which rotates with the wheel, thereby exerting force on the wheel as it rotates to change the configuration of the spokes.

At least one tension mass 210 is attached to outer spoke collar 212 by flexible cable 214. The flexible cable 214 is routed over a reaction pulley 216 which is attached to wheel rim 218. When the wheel rotates slowly (as seen in FIG. 7A), the force exerted on outer spoke collar 212 from the mass 210 is low, allowing outer spoke collar 212 (i.e., movable collar) to be pulled closer to inner spoke collar 220 (non movable collar) by the keeper spring 226. This results in relatively low tension in each spoke ring 222 which maintains the wheel in a "soft" configuration with an enlarged ground contact patch size of traction element 224. As the rotational speed of the wheel increases (as seen in FIG. 7B), the tension mass 210 exerts an increasingly larger force on flexible cable 214, forcing the outer spoke collar 212 to move away from inner spoke collar 220. The movement of outer spoke collar 212 increases the tension in each spoke ring 222, increasing the wheel firmness and decreasing the ground contact patch size of traction element 224.

Figure 8A:
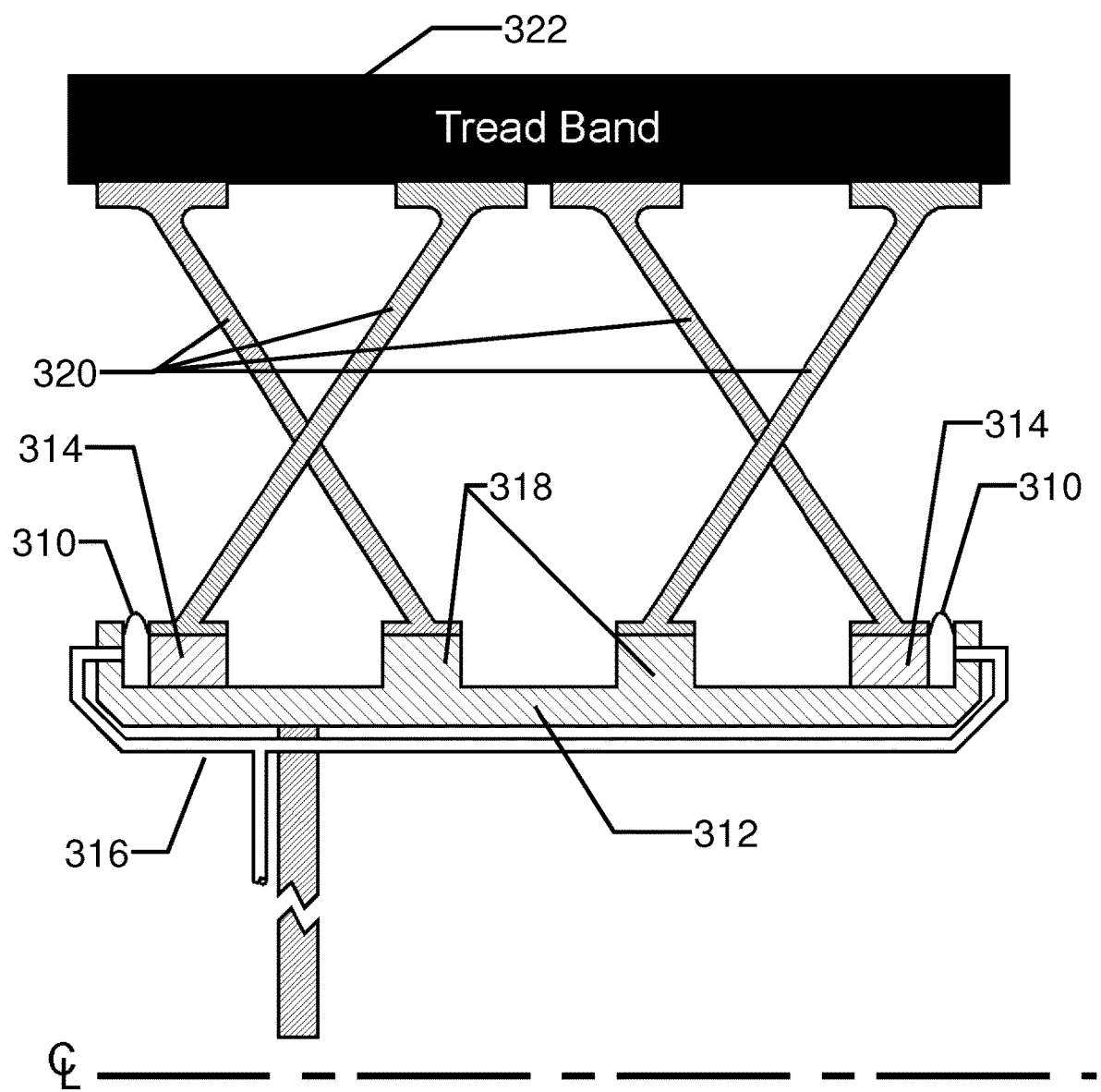
FIG. 8A describes a pneumatic stiffness adjustment mechanism which can be employed with either preferred embodiment of a wheel of variable stiffness of the present invention.
Figure 8B:
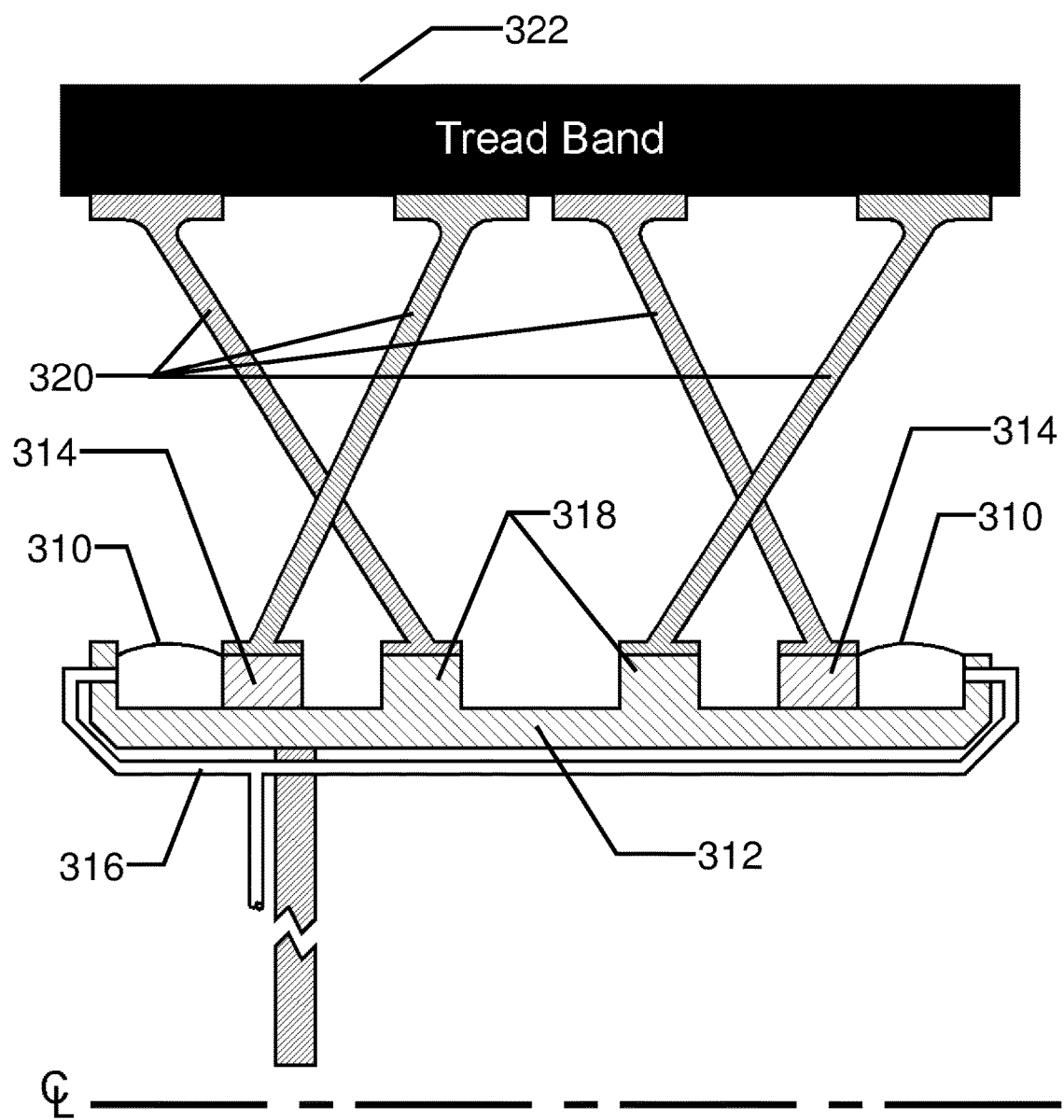
FIG. 8B describes a pneumatic stiffness adjustment mechanism which can be employed with either preferred embodiment of a wheel of variable stiffness of the present invention.

FIG. 8A and FIG. 8B illustrate another preferred embodiment according to the present invention for pneumatically adjusting the stiffness of spokes 320. An air spring 310 (and optionally a plurality of air springs) is affixed to wheel rim 312 and to the outer spoke collar 314. All air springs 310 are in fluid communication with a central pressurized air source (not shown) via pneumatic tubing 316. When air is supplied to pneumatic tubing 316, the air springs 310 inflate and force the outer spoke collar 314 to move closer to the inner spoke collar 318 (i.e., moving from the position illustrated in FIG. 8A to the position illustrated in FIG. 8B). As with previously described embodiments, this movement of the outer spoke collar 314 decreases the tension in spoke ring 320 and increases the ground contact patch size of traction element 322 (i.e., decreases firmness of the wheel).

When a pressure relief valve (not shown) is opened, air flows out of air springs 310 and into pneumatic tubing 316 and is exhausted to atmosphere through pressure relief valve (not shown). The deflated air springs 310 allow the outer spoke collar 314 to move away from inner spoke collar 318 (to the position seen in FIG. 8A), increasing the tension in spoke ring 320 and decreasing the ground contact patch size of traction element 322. This relationship may appear counterintuitive when compared with a pneumatic time, however this preferred embodiment of the wheel remains stiff if left in its native shape and will become more compliant by pushing the spoke rings inward to decrease the spoke tension.

Preferably, the pressurized air for the air springs 310 is provided through a hollow, pressurized vehicle axle spindle which couples and thereby seals to the wheel similar to currently known central tire inflation systems. This sealed region of the wheel is in communication with pneumatic tubing 316, allowing the vehicle (e.g., a computer and software within the vehicle) to pneumatically control the air springs 310 and thus the firmness of the wheel.

It should be understood that many of the elements described in the embodiments of this specification can be mixed or incorporated with other embodiments set forth in this specification without departing from the present invention.

Figure 9:
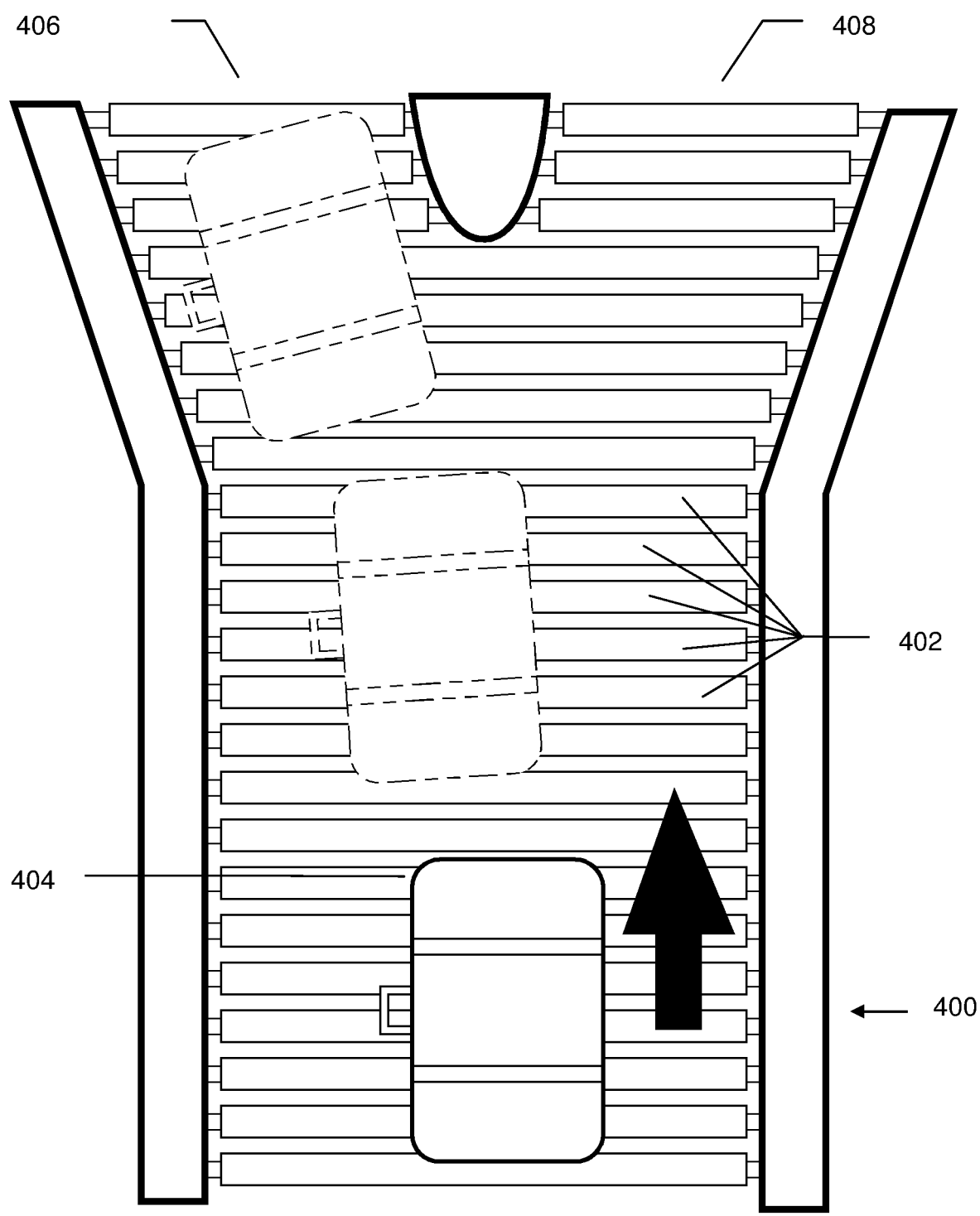
FIG. 9 illustrates a top view of a luggage carrier according to a preferred embodiment of the present invention.
Figure 10A:
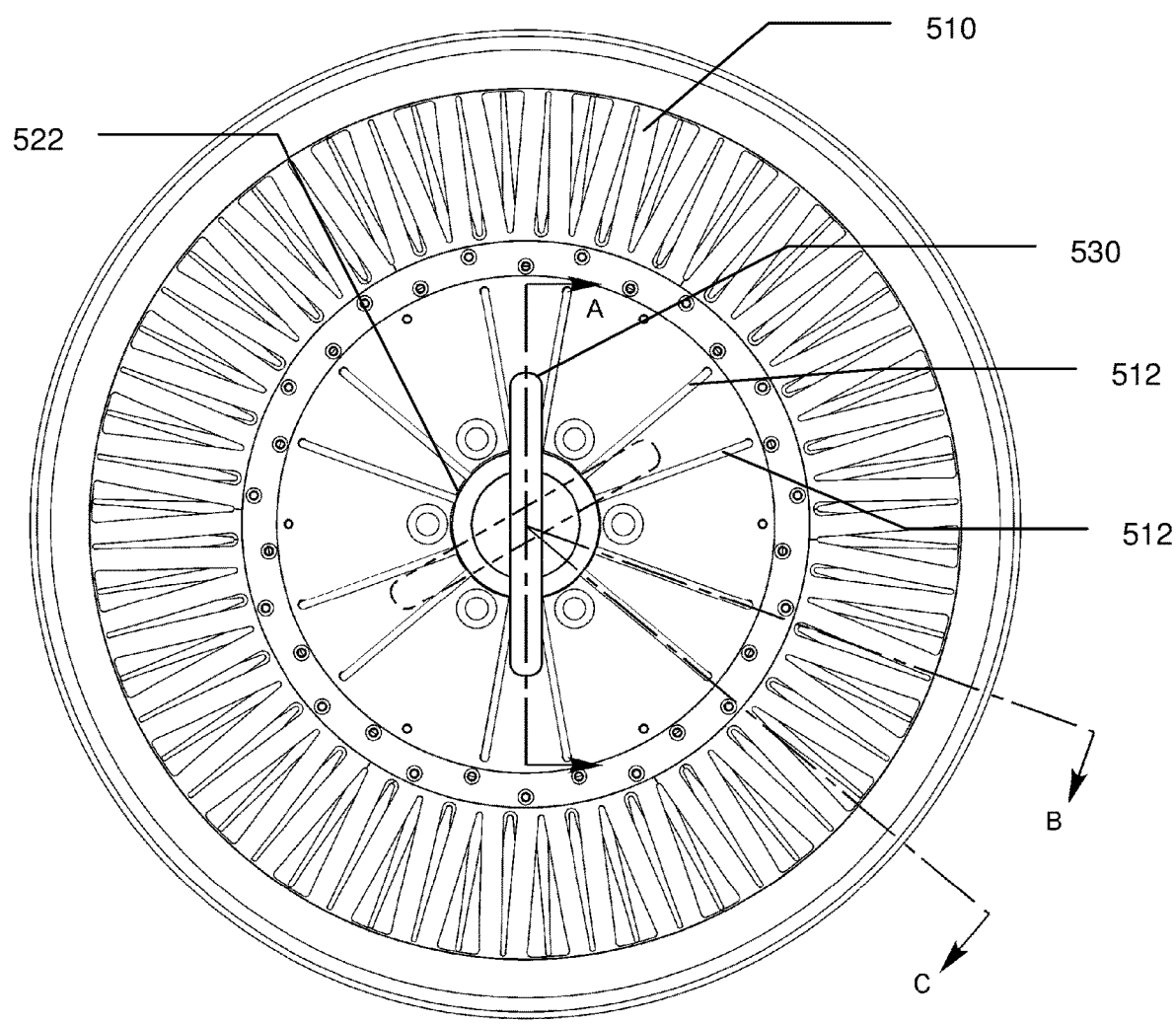
FIG. 10A is a front view of a variable stiffness wheel with a manually-operated stiffness adjustment mechanism according to a preferred embodiment of the present invention.
Figure 10B:
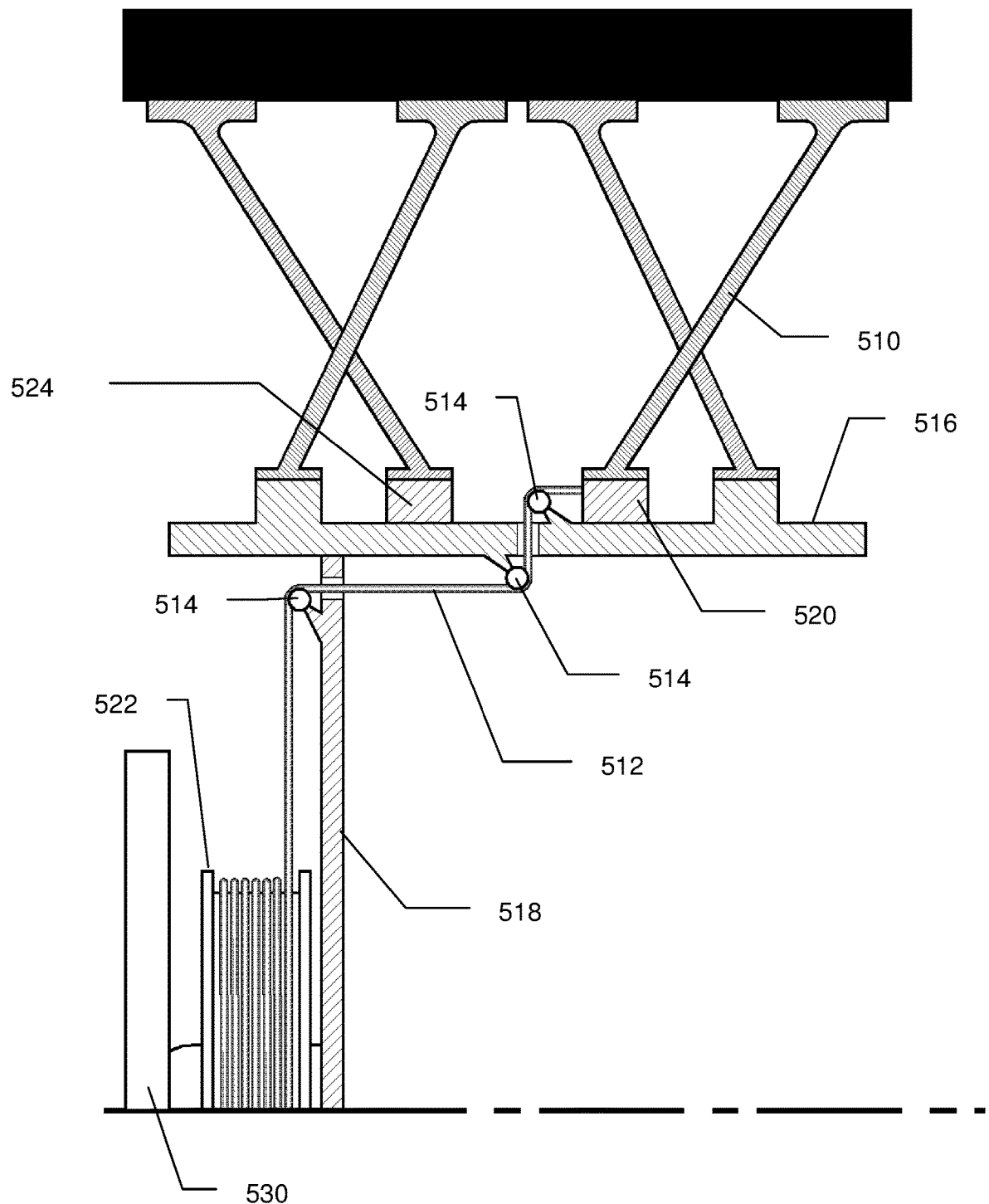
FIG. 10B is a partial cross sectional view along line B of FIG. 10A.
Figure 10C:
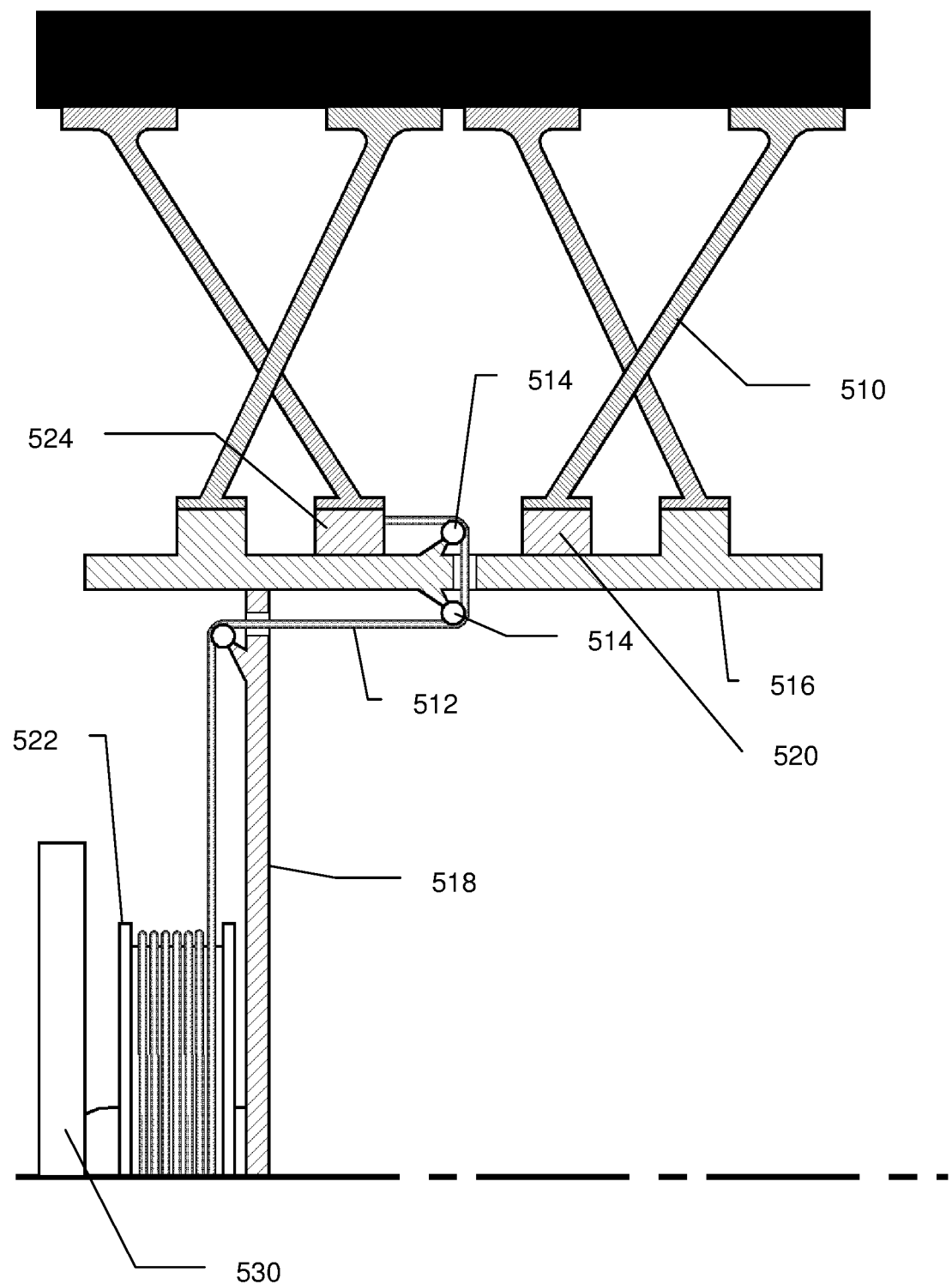
FIG. 10C is a partial cross sectional view along line C of FIG. 10A.

Referring to FIG. 9, a conveyor device 400 consists of a plurality of rollers 402 with a variable lateral compliance capability, as described in various embodiments of the present specification. However, since the rollers 402 typically have a greater relative width compared with wheels, a plurality of spoke segments may be included along the length of rollers 402. The rollers 402 may be configured to freely spin or may be motorized for propelling luggage 404 in the direction shown with the arrow.

When a sensor (not shown) detects a piece of luggage 404 which should be routed to the leftmost conveyor chute 406, or alternately a user wishes to change the route of the luggage, the lateral compliance of rollers 402 is modulated. In this respect the course or direction of luggage 404 is changed. Similarly, the lateral compliance of rollers 402 may be modulated to direct luggage to the rightmost conveyor chute 408.

FIGS. 10A, 10B, 10C, 11, 12A and 12B illustrate another preferred embodiment according to the present invention for manually adjusting the stiffness of spokes 510. Generally, a handle 530 rotates a central cable spool 522 which increases or decreases a cable tension on outboard inner spoke collar 524 and inboard inner spoke collar 520, thereby adjusting the tension of the spokes 510.

The inboard inner spoke collar 520 is connected to the cable spool 522 by a flexible cable 512 (or optionally a plurality of flexible cables). The flexible cable 512 is routed over reaction pulleys 514 between the wheel rim 516 and wheel center 518. Similarly, the outboard inner spoke collar 524 is connected to cable spool 522 by a flexible cable 512 (or optionally a plurality of flexible cables). The flexible cable 512 is routed over additional reaction pulleys 514 between wheel rim 516 and wheel center 518.

In this respect, as the spool 522 winds the cable 512, the pulleys 514 support the increased cable tension that moves both inner spoke collars 520 and 524 toward the center of the wheel. Thus, the tension of the spokes 510 is modified, similar to the previously described embodiments of this specification.

Figure 11:
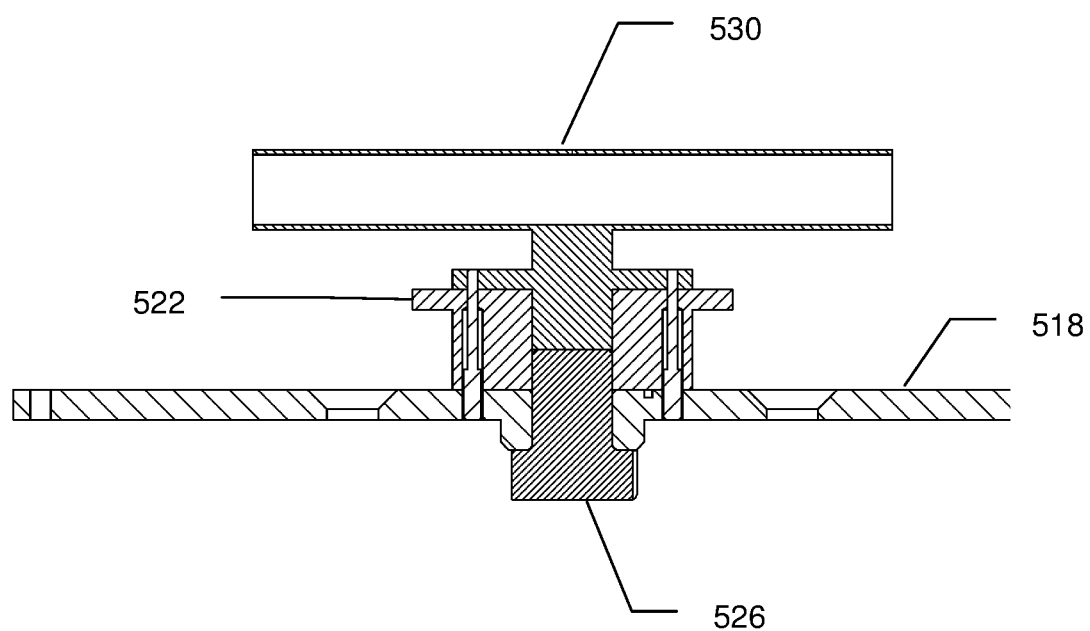
FIG. 11 is a partial cross sectional view along line A of FIG. 10A.
Figure 12A:
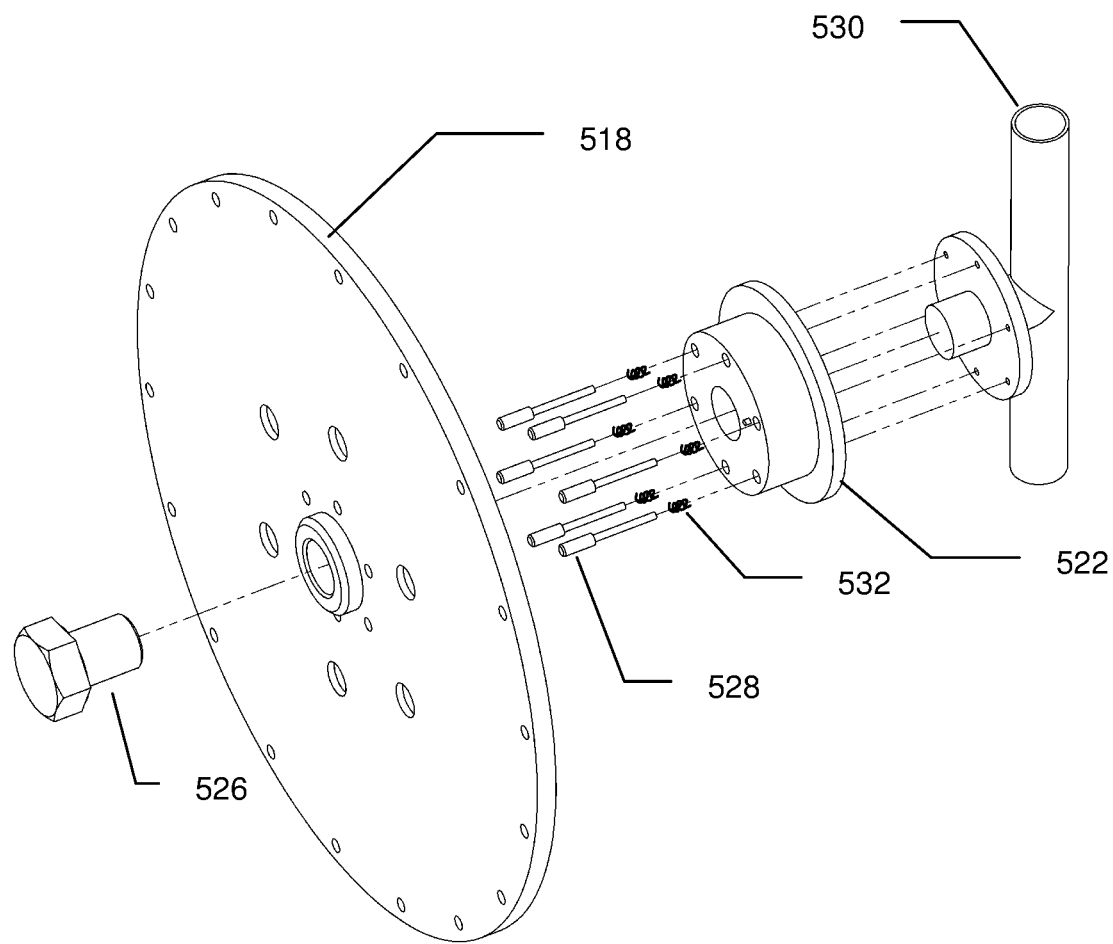
FIG. 12A is an exploded isometric view of the wheel center and manually-operated stiffness adjustment mechanism of FIG. 11.
Figure 12B:
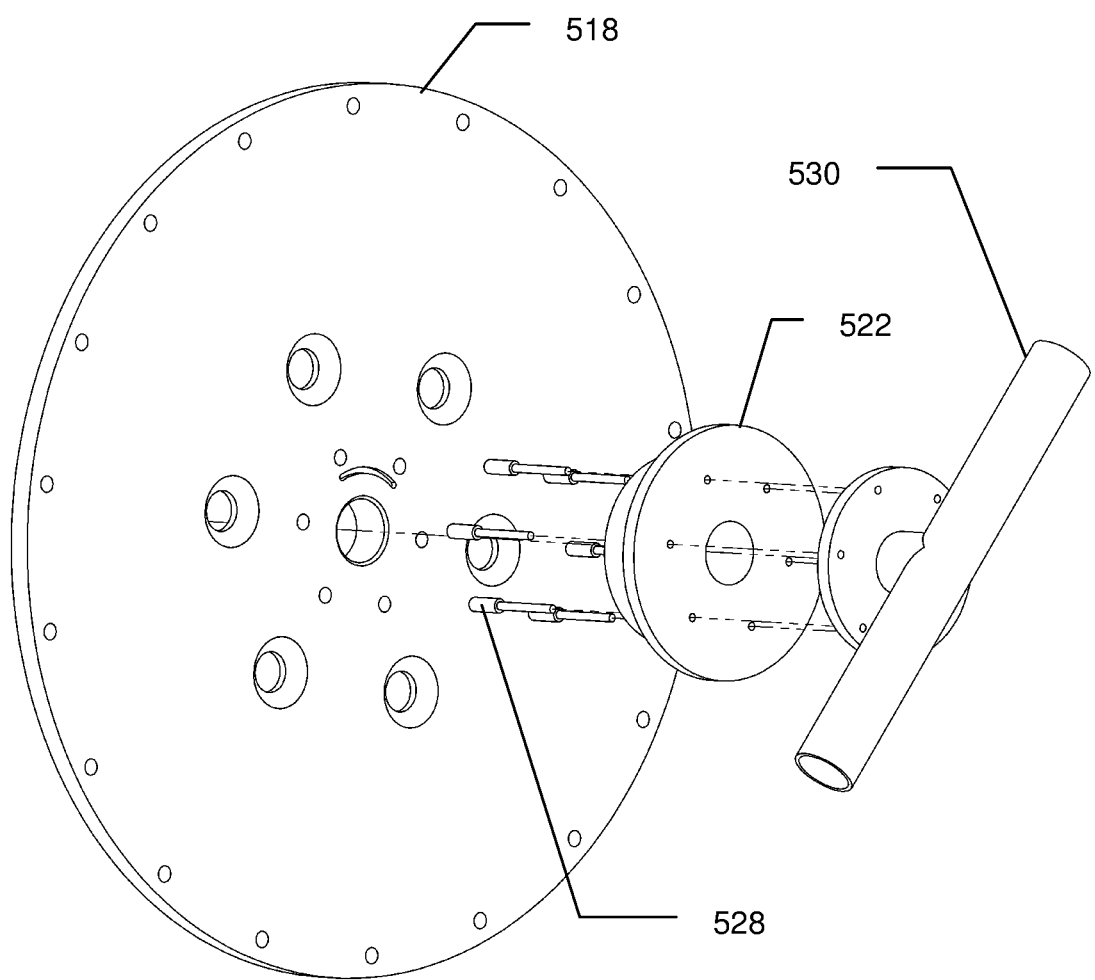
FIG. 12B is an additional exploded isometric view of the wheel center and manually-operated stiffness adjustment mechanism of FIG. 11.

Referring to FIGS. 11-12B, the cable spool 522 is attached to the wheel center 518 by fastener 526 and prevented from rotating with respect to wheel center 518 by engagement of a shear pin 528 (or optionally a plurality of shear pins) with wheel center 518. The shear pin 528 is attached to handle 530 and is prevented from disengaging from wheel center 518 by helical spring 532.

When the user wishes to increase spoke tension, the operator pulls the handle 530 laterally outward, disengaging the shear pin 528 from the wheel center 518. After shear pin 528 is disengaged, the operator rotates the handle 530, causing the cable spool 522 to rotate. When the cable spool 522 rotates, the flexible cable 512 is pulled onto the cable spool 522, drawing the outboard inner spoke collar 524 and the inboard inner spoke collar 520 towards each other and increasing the tension in the spokes 510. When a desired spoke tension is reached, the operator pushes the handle 530 laterally inwards, re-engaging shear pin 528 with the wheel center 518.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A system for modifying a stiffness of a rotating element comprising:
   a rim;
   a collar member disposed to slide on said rim;
   an outer radial member;

a plurality of wheel segments having first ends fixed to said collar member and second ends fixed to said outer radial member;
a preload adjuster in contact with said collar member;
the preload adjuster axially moving said collar member to change a position of said plurality of wheel segments and thereby adjust a firmness of at least part of said rotating element.

2. The system of claim 1, further comprising a second plurality of wheel segments having first ends fixed to a second collar member and second ends fixed to said outer radial member, the second collar member positively fixed to the rim to limit axial movement of the second collar member on the rim.

3. The system of claim 1, wherein the outer radial member is overmolded on to the second ends of the plurality of wheel segments.

4. The system of claim 1, further comprising:
a second collar member disposed to slide on the inner radial member; and
a second plurality of wheel segments having first ends fixed to the second collar member and second ends fixed to the outer radial member.

5. A method of modifying a stiffness of a circular element during rotation comprising:
obtaining a circular element coupled around a rim by a plurality of wheel segments;
rotating the rim about an axle; and
modifying a firmness of said circular element by directing a preload adjuster to change a tension of the plurality of wheel segments.

6. The method of claim 5, wherein modifying the firmness of said circular element by directing the preload adjuster to change the tension of the plurality of wheel segments comprises applying power to said plurality of wheel segments so as to change a configuration of said plurality of wheel segments.

7. The method of claim 5, wherein modifying the firmness of said circular element by directing the preload adjuster to change the tension of the plurality of wheel segments comprises independently changing a tension of a first plurality of wheel segments and a second plurality of wheel segments.

8. The method of claim 5, wherein modifying the firmness of said circular element by directing the preload adjuster to change the tension of the plurality of wheel segments comprises modifying a heading of a vehicle.

9. A system for modifying a stiffness of a rotating element comprising:
an inner radial member;
a first ring member disposed to slide on said inner radial member;
a second ring member disposed to slide on said inner radial member independent of the first ring member;
an outer radial member positioned substantially around said inner radial member;
a first plurality of wheel segments having first ends fixed to said first ring member and second ends fixed to said outer radial member;
a second plurality of wheel segments having first ends fixed to said second ring member and second ends fixed to said outer radial member.

10. The system of claim 9, further comprising a tread band disposed around an outer circumference of said outer radial member for providing traction for a vehicle.

11. The system of claim 9, wherein the outer radial member is overmolded on to the second ends of the first plurality of wheel segments.

12. The system of claim 9, further comprising a third plurality of wheel segments having first ends fixed to a third ring member and second ends fixed to said outer radial member.

13. The system of claim 12, wherein the third ring member is positively fixed to the inner radial member to limit axial movement of the third ring member on the inner radial member.

14. A method of modifying a stiffness of a circular element during rotation comprising:
providing a circular element coupled to an axle;
rotating said circular element with said axle; and
modifying a firmness of said circular element by directing an actuator to change a tension of a plurality of spokes disposed on said rotating element by adjusting a pressure of media within each of said plurality of spokes.

15. A method of modifying a stiffness of a circular element during rotation comprising:
providing a circular element coupled to an axle;
supporting a weight of an item on said circular element
rotating said circular element with said axle; and
modifying a firmness of said circular element by directing an actuator to change a tension of a plurality of spokes disposed on said rotating element by independently changing a tension of a first plurality of spokes and a second plurality of spokes so as to change a direction of said item.

* * * * *